United States Patent
Niimi et al.

(10) Patent No.: US 10,968,624 B2
(45) Date of Patent: Apr. 6, 2021

(54) GYPSUM PANEL AND METHOD FOR PRODUCING GYPSUM PANEL

(71) Applicant: YOSHINO GYPSUM CO., LTD., Tokyo (JP)

(72) Inventors: Katsumi Niimi, Tokyo (JP); Itaru Yokoyama, Tokyo (JP); Kazuyuki Umehara, Tokyo (JP); Yuji Ataka, Tokyo (JP); Keiichi Ohki, Tokyo (JP); Shinji Yoshida, Osaka (JP); Saburou Yamato, Osaka (JP); Tadashi Nakagaki, Osaka (JP); Ayaka Taniguchi, Osaka (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 0 days.

(21) Appl. No.: 16/060,091

(22) PCT Filed: Dec. 5, 2016

(86) PCT No.: PCT/JP2016/086116
§ 371 (c)(1),
(2) Date: Jun. 7, 2018

(87) PCT Pub. No.: WO2017/104473
PCT Pub. Date: Jun. 22, 2017

(65) Prior Publication Data
US 2018/0355605 A1    Dec. 13, 2018

(30) Foreign Application Priority Data

Dec. 14, 2015 (JP) .............................. JP2015-243579

(51) Int. Cl.
*E04C 2/00* (2006.01)
*E04B 1/72* (2006.01)
(Continued)

(52) U.S. Cl.
CPC ................ *E04B 1/72* (2013.01); *A01N 25/34* (2013.01); *B28B 19/0092* (2013.01);
(Continued)

(58) Field of Classification Search
CPC .... A01N 25/00; B28B 19/0092; C04B 24/12; C04B 28/14; C04B 35/6262; C04B 2111/00413; E04B 1/72
(Continued)

(56) References Cited

U.S. PATENT DOCUMENTS 4,648,202 A *  3/1987  Renth ........................ B05B 1/14
                                                          43/124
6,290,992 B1 *  9/2001  Magnuson-Hawkins ....................
                                                          A01N 25/16
                                                          424/405
(Continued)

FOREIGN PATENT DOCUMENTS

AU        479049      12/1976
DE       2438365       2/1976
(Continued)

OTHER PUBLICATIONS

International Search Report for PCT/JP2016/086116 dated Jan. 10, 2017.
(Continued)

*Primary Examiner* — Brian E Glessner
*Assistant Examiner* — James J Buckle, Jr.
(74) *Attorney, Agent, or Firm* — IPUSA, PLLC (57) ABSTRACT

A gypsum panel includes a gypsum core containing a termiticide with poor water solubility, wherein the gypsum core has a first end region, a center region, and a second end region having an equal thickness and extending along a thickness direction from one surface side to another surface side, the termiticide is contained in each of the first end
(Continued)

region, the center region, and the second end region, and a content of the termiticide in the center region is lower than a content of the termiticide in the first end region and in the second end region.

3 Claims, 2 Drawing Sheets

(51) Int. Cl.
*C04B 24/12* (2006.01)
*C04B 28/14* (2006.01)
*B28B 19/00* (2006.01)
*A01N 25/34* (2006.01)
*C04B 35/626* (2006.01)
*C04B 111/00* (2006.01)

(52) U.S. Cl.
CPC .............. *C04B 24/12* (2013.01); *C04B 28/14* (2013.01); *C04B 35/6262* (2013.01); *C04B 2111/0062* (2013.01); *C04B 2111/00413* (2013.01); *C04B 2235/5436* (2013.01)

(58) Field of Classification Search
USPC .......................................................... 52/517
See application file for complete search history.

(56) References Cited

U.S. PATENT DOCUMENTS

| 8,623,423 | B2* | 1/2014 | Cook | ....................... C03C 1/026 |
| | | | | 424/657 |
| 2002/0112651 | A1 | 8/2002 | Yu et al. | |
| 2006/0070321 | A1* | 4/2006 | Au | ........................... C04B 28/26 |
| | | | | 52/232 |
| 2006/0252849 | A1* | 11/2006 | Rose | ........................ C09D 5/14 |
| | | | | 523/122 |
| 2007/0082170 | A1* | 4/2007 | Colbert | .................... B01F 5/221 |
| | | | | 428/70 |
| 2009/0020622 | A1* | 1/2009 | Walker, Jr. | ............ B05B 7/1486 |
| | | | | 239/8 |
| 2010/0313515 | A1* | 12/2010 | Betz | ....................... E04C 2/3405 |
| | | | | 52/588.1 |
| 2011/0191916 | A1* | 8/2011 | Erickson | .................. A01H 5/10 |
| | | | | 800/300 |
| 2018/0355605 | A1* | 12/2018 | Niimi | ....................... C04B 24/12 |

FOREIGN PATENT DOCUMENTS

| JP | S51-045121 | 4/1976 |
| JP | S59-000812 U | 1/1984 |
| JP | S63-046509 U | 3/1988 |
| JP | S63-055239 | 3/1988 |
| JP | H02-209230 | 8/1990 |
| JP | H08-143030 | 6/1996 |
| JP | H10-017351 | 1/1998 |
| JP | 2010-540292 | 12/2010 |
| TW | I247731 | 1/2006 |
| WO | 2007/025734 | 3/2007 |

OTHER PUBLICATIONS

Extended European Search Report for 16875456.2 dated Jan. 3, 2019.
Indian Office Action for 201817022277 dated Feb. 27, 2020.
Taiwanese Office Action dated Mar. 30, 2020 (TW Application No. 105140598).
Japanese Office Action dated Jul. 7, 2020 (Japanese Patent Application No. 2017-555989).
Office Action dated Dec. 31, 2020 (Chinese Patent Application No. 201680072850.X).
"Rubber Auxiliary Handbook", Professional Committee of the Chinese Chemical Society Rubber, Chemical Industry Press, Beijing, 1st edition, Apr. 2000 (With English Translation).

* cited by examiner

GYPSUM PANEL AND METHOD FOR PRODUCING GYPSUM PANEL

TECHNICAL FIELD

The present invention relates to a gypsum panel and a method for producing a gypsum panel.

BACKGROUND ART

Conventionally, gypsum panels are used in various applications such as building materials.

Such gypsum panels are known to be damaged or destroyed by termites. Thus, gypsum panels containing termiticides have been examined in recent years.

As a method for producing such a gypsum panel containing a termiticide, a method for applying a solution containing a termiticide to the surface of the gypsum panel has been examined, for example.

However, in order to obtain a sufficient anti-termite effect by applying the solution containing the termiticide to the surface of the gypsum panel, the solution containing the termiticide needs to be applied to the gypsum panel in large amounts, which could increase working burden on a worker.

Conversely, when the solution containing the termiticide is applied in small amounts, it becomes difficult to uniformly apply the solution containing the termiticide to the surface of the gypsum panel, which may result in an insufficient effect.

Further, in a case where the gypsum panel is produced in such a manner that the solution containing the termiticide is applied to the surface of the gypsum panel and is dried, there is a possibility that deformation such as warpage of the gypsum panel may be caused by the drying step.

Also, in a case where the gypsum panel is produced in such a manner that the solution containing the termiticide is applied to the surface of the gypsum panel, the solution containing the termiticide is contained only in the surface that is exposed at the time when the solution is applied. Therefore, when the gypsum panel is cut after the solution containing the termiticide is applied, the termiticide is not contained in the cut sections, resulting in insufficient protection.

Patent Document 1 discloses a method for producing a termite-proof gypsum panel for building materials. According to the method, an organic insecticide, especially a termiticide, which is oil soluble or soluble in an oily solvent, is dispersed in a mixed solution such that an aqueous dispersion is obtained. The aqueous dispersion is added in an amount of 0.005 to 5 wt % relative to the dry weight of a curable material used. Patent Document 1 further discloses that the insecticide, especially the termiticide, can be uniformly distributed throughout a gypsum molded body or a gypsum panel for building materials.

Related-Art Documents

[Patent Document 1] Japanese Laid-Open Patent Publication NO. 51-45121

SUMMARY OF THE INVENTION

Problem to be Solved by the Invention

However, according to the method for producing a termite-proof gypsum panel for building materials disclosed in Patent Document 1, although the termiticide is uniformly contained in the inside, which is not normally exposed, of the gypsum panel, the termiticide is required to be added in large amounts in order to obtain a sufficient effect. Accordingly, there has been a demand for a gypsum panel that exhibits a sufficient anti-termite effect for the surface while suppressing the content of a termiticide, and also prevents damage by termites even when the gypsum panel is cut and its inside is exposed.

In view of the above-described problem, it is an object of the present invention to provide a gypsum panel that has a favorable anti-termite effect while suppressing the content of a termiticide.

Means for Solving the Problem

According to an aspect of the present invention, a gypsum panel includes a gypsum core containing a termiticide with poor water solubility, wherein the gypsum core has a first end region, a center region, and a second end region having an equal thickness and extending along a thickness direction from one surface side to another surface side, the termiticide is contained in each of the first end region, the center region, and the second end region, and a content of the termiticide in the center region is lower than a content of the termiticide in the first end region and in the second end region.

Advantageous Effects of the Invention

According to an aspect of the present invention, it is possible to provide a gypsum panel that has a favorable anti-termite effect while suppressing the content of a termiticide.

MODE FOR CARRYING OUT THE INVENTION

In the following, embodiments of the present invention are described with reference to the accompanying drawings. However, the present invention is not limited to the embodiments described below, and various variations and modifications of the embodiments described below may be made without departing from the scope of the present invention.

[Gypsum Panel]

An exemplary configuration of a gypsum panel of an embodiment will be described.

The gypsum panel of the present embodiment includes a gypsum core containing a termiticide with poor water solubility.

The gypsum core has three regions of a first end region, a center region, and a second end region having an equal thickness and extending along a thickness direction from one surface side to another surface side, and a termiticide can be contained in each of the first end region, the center region, and the second end region. Further, a content of the termiticide in the center region can be made lower than a content of the termiticide in the first end region and in the second end region.

Figure 1:
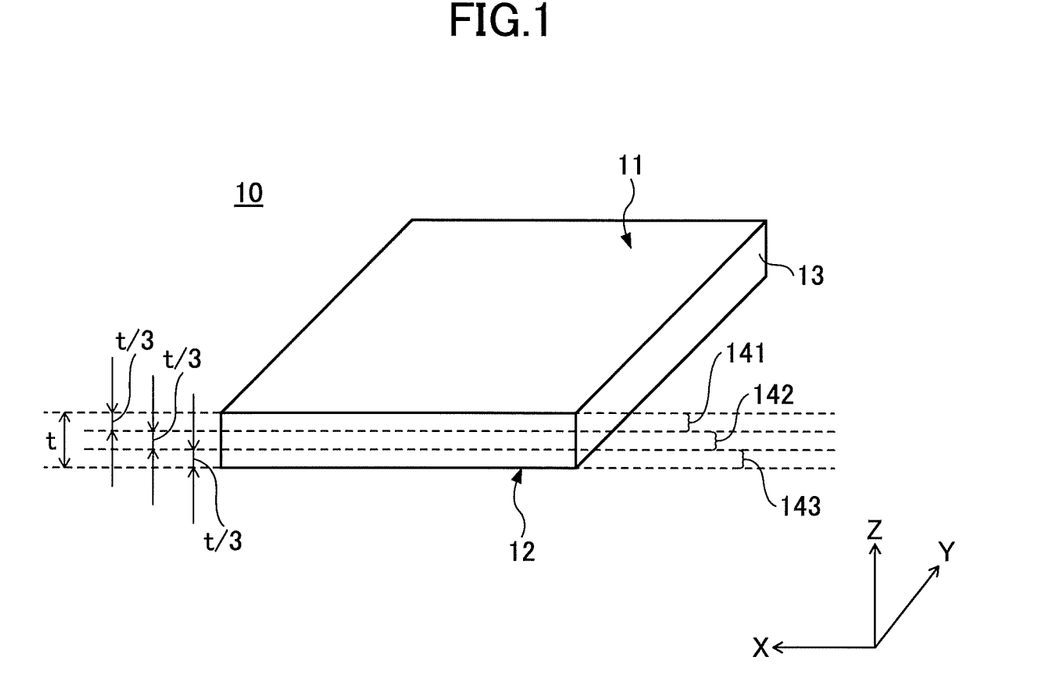
FIG. 1 is a drawing illustrating a gypsum panel according to an embodiment of the present invention.

Referring to FIG. 1, the gypsum panel according to the present embodiment will be described.

FIG. 1 is a perspective view illustrating a gypsum core 10 of the gypsum panel according to the present embodiment.

As illustrated in FIG. 1, the gypsum core 10 according to the present embodiment has a plate shape and also has one surface 11 and the other surface 12. A side surface 13 extends between the one surface 11 and the other surface 12.

Although the illustrated gypsum core 10 has a rectangular shape, the gypsum core 10 is not limited to this shape. The gypsum panel including the gypsum core 10 can be used for building materials and can be formed in an appropriate shape according to the application.

Also, the gypsum panel according to the present embodiment is not limited to a specific type. Examples of the gypsum panel include a gypsum board, a glass mat gypsum board, a glass-fiber-nonwoven-fabric-containing gypsum panel, and a slag gypsum panel.

In the gypsum panel according to the present embodiment, a board base and a glass mat used as a surface material may be disposed on the one surface 11 and the other surface 12 of the gypsum core 10 in accordance with the application. Further, a glass fiber nonwoven fabric (glass tissue) may be embedded in the one surface 11 and the other surface 12. In addition, the gypsum panel may include the gypsum core 10 alone without having the surface material disposed on the one surface 11 or the other surface 12 of the gypsum core 10.

Further, the gypsum core 10 of the gypsum panel according to the present embodiment includes three regions of a first end region 141, a center region 142, and a second end region 143 having an equal thickness and extending along the thickness direction, and a termiticide is, preferably contained in each of the three regions. The thickness direction of the gypsum core 10 represents a z-axis direction vertical to the one surface 11 and the other surface 12 of FIG. 1. As illustrated in FIG. 1, when the thickness of the gypsum core 10 is expressed as t, the thicknesses of the first end region 141, the center region 142, and the second end region 143 are each t/3.

As described, all the three regions of first end region 141, the center region 142, and the second end region 143 contain a termiticide. Accordingly, even when the gypsum is cut, the termiticide is contained in the cut faces, allowing a sufficient anti-termite effect to be exhibited.

However, in order for the gypsum core 10 to uniformly contain a termiticide across the thickness direction, the large amount of the termiticide is required to be added, which is not preferable in terms of costs. Preferably, the center region 142 contains the smallest amount of the termiticide. Namely, the content of the termiticide in the center region 142 is preferably lower than the content of the termiticide in the first end region 141 and of the second end region 143. Also, in the gypsum core 10, the termiticide is preferably distributed mainly in the first end region 141 and in the second end region 143, which are surface sides (front and back surface sides) of the gypsum core 10.

As described above, in order to sufficiently exhibit an anti-termite effect, a termiticide is required to be contained in cut faces that are exposed when the gypsum panel is cut. In the gypsum panel according to the present embodiment, by containing a termiticide in the entire gypsum core, a sufficient anti-termite effect can be exhibited even when cut faces are formed and exposed.

However, the cut faces are exposed only in limited cases such as when the gypsum panel is cut as described above. Also, considering that the gypsum core 10 occupies most of the area of the gypsum panel and is disposed in the vicinity of the surfaces of the gypsum panel, it is possible to efficiently exhibit an anti-termite effect by causing a larger amount of a termiticide to be contained in the first end region 141 and in the second end region 143, which include the one surface 11 and the other surface 12 of the gypsum core 10, than that in the center region 142.

The first end region 141 and the second end region 14 also form parts of cut faces exposed when the gypsum panel is cut. Therefore, although the termiticide is distributed mainly in the first end region 141 and the second end region 143, a sufficient anti-termite effect can be exhibited also for the cut faces, with the aid of the termiticide contained in the center region 142.

As described above, the board base paper, the glass mat, and the glass fiber nonwoven fabric may be disposed on the surfaces of or in the vicinity of the surfaces of the gypsum core of the gypsum panel in accordance with the application. Therefore, in a case where the distribution of a termiticide contained in the gypsum core is analyzed, the board base paper or the like is first removed. Subsequently, the gypsum core is divided into three regions along the thickness direction and each of the divided regions can be analyzed.

To be more specific, the board base paper and the like can be removed by removing a thickness of 1 mm from the surface of the gypsum panel, although this depends on the thickness of the gypsum panel. By removing the surface of the gypsum panel, the gypsum core is obtained. The obtained gypsum core is divided into three regions with the same thickness along the thickness direction, and the divided three regions are analyzed in the order of the first end region, the center region, and the second end region from the one surface side.

The content of a termiticide included in the gypsum panel according to the present embodiment is not particularly limited, and may be selected depending on the type of the termiticide used. For example, the content of a termiticide per 1 $cm^3$ of the gypsum core is preferably greater than or equal to 0.1 μg and less than or equal to 330 μg. In particular, the content of the termiticide per 1 $cm^3$ of the gypsum core is more preferably greater than or equal to 0.1 μg and less than or equal to 180 μg and even more preferably greater than or equal to 2.5 μg and less than or equal to 180 μg.

By adjusting the content of the termiticide per 1 $cm^3$ of the gypsum core to be greater than or equal to 0.1 μg, it becomes possible to disperse the termiticide across the entire gypsum core, allowing a sufficient anti-termite effect to be exhibited.

Further, by adjusting the content of the termiticide per 1 $cm^3$ of the gypsum core to be less than or equal to 330 μg per 1 $cm^3$ of the gypsum core, it also becomes possible to suppress the amount of the termiticide used, providing an advantage in terms of costs.

As used herein, the content of the termiticide per 1 $cm^3$ of the gypsum core refers to an average value across the entire gypsum core including the above-described first end region, the center region, and the second end region.

Although a method for producing a gypsum panel according to the present embodiment will be described in detail later, the gypsum panel according to the present embodiment is produced by kneading a raw material including at least calcined gypsum, water, and a termiticide so as to form a gypsum slurry, molding the gypsum slurry, and hardening the gypsum slurry through hydration.

Namely, the gypsum core of the gypsum panel according to the present embodiment is a gypsum hardened body. The gypsum hardened body is obtained by causing calcined gypsum (hemihydrate gypsum) in the gypsum slurry to set and solidify by forming acicular crystals of dihydrate gypsum through a hydration reaction.

Accordingly, the gypsum panel according to the present embodiment can include the dihydrate gypsum and the termiticide.

The termiticide included in the gypsum panel according to the present embodiment is not particularly limited. Various types of termiticides may be used as long as such termiticides can be applied to the gypsum panel.

However, a termiticide with poor water solubility is preferably used. As used herein, the termiticide with poor water solubility refers to a termiticide with solubility in water of 1 or less mass %. By using the termiticide with poor water solubility, it is possible to produce the gypsum panel in such a manner that, when the termiticide migrates to the surface sides of the gypsum panel in the process of hardening the gypsum slurry after being molded, the termiticide is not distributed excessively on the surface sides of the gypsum panel and is included in the center portion.

Examples of the termiticide include a neonicotinoid compound, a pyrethroid compound, an organochlorine compound, an organophosphorus compound, a carbamate compound, a pyrrole compound, a phenylpyrazole compound, and an oxadiazine compound. Preferably, the termiticide is the neonicotinoid compound (specifically, clothianidin, for example).

Examples of the neonicotinoid compound include (E)-1-(2-chloro-1,3-thiazol-5-ylmethyl)-3-methyl-2-nitroguanidine (common name: clothianidin), N-acetyl-N-(2-chloro-thiazole-5-yl)methyl-N'-methyl-N"-nitroguanidine, N-(2-chlorothiazole-5-yl)methyl-N-methoxycarbonyl-N'-methyl-N"-nitroguanidine, 1-(6-chloro-3-pyridylmethyl)-N-nitroimidazoline-2-ylideneamine (common name: imidacloprid), (EZ)-3-(2-chloro-1,3-thiazole-5-ylmethyl)-5-methyl-1,3,5-oxadiazinan-4-ylidene(nitro)amine (common name: thiamethoxam), and (E)-N'-[(6-chloro-3-pyridinyl)methyl]-N"-cyano-N'-methylacetamidine (common name: acetamiprid). Preferably, the neonicotinoid compound is (E)-1-(2-chloro-1,3-thiazol-5-ylmethyl)-3-methyl-2-nitroguanidine (common name: clothianidin).

Examples of the pyrethroid compound include allethrin, permethrin, tralomethrin, bifenthrin, acrinathrin, α-cypermethrin, cyfluthrin, cyphenothrin, prallethrin, etofenprox, silafluofen, and fenvalerate.

Examples of the organochlorine compound include Kelthane.

Examples of the organophosphorus compound include phoxim, pyridaphenthion, fenitrothion, tetrachlorvinphos, dichlofenthion, and propetamphos.

Examples of the carbamate compound include carbaryl, fenobucarb, and propoxur.

Examples of the pyrrole compound include chlorfenapyr.

Examples of the phenylpyrazole compound include fipronil.

Examples of the oxadiazine compound include sindoxacarb.

Further, as a termiticide included in the gypsum panel according to the present embodiment, one type of a termiticide may be included or two or more types of termiticides may be concurrently included.

A formulation of the above-described termiticide is not particularly limited. For example, the termiticide in a microencapsulated formulation, a dust formulation, a granular formulation, a flowable formulation, and an emulsifiable formulation may be used. Of these formulations of the termiticide, the microencapsulated formulation is preferably used from average particle size and controlled-release points of view.

Further, foam may be added to the gypsum slurry prepared in producing the gypsum panel according to the present embodiment. Therefore, the gypsum panel according to the present embodiment may include pores formed as a result of adding the foam to the gypsum slurry. By adjusting the amount of the pores formed by the foam included in the gypsum panel, specific gravity of the gypsum panel can fall within a desired range.

The size of the pores formed by the foam included in the gypsum panel is not particularly limited. An average value of the diameters of the pores formed by the foam included in the gypsum panel is preferably greater than or equal to 100 μm and less than or equal to 1000 μm. When the average diameter of the pores formed by the foam is within the above-described range, the strength of the gypsum core can be increased.

Further, the average value of the diameters of the pores formed by the foam included in the gypsum panel is preferably greater than or equal to 200 μm and less than or equal to 800 μm, and more preferably greater than or equal to 200 μm and less than or equal to 600 μm. When the average diameter of the pores formed by the foam included in the gypsum panel is within the above-described range, the strength of the gypsum panel can be further increased.

Examples of a method for forming a desired size of foam included in the gypsum panel include a method for selecting the size of foam by a foaming machine that foams a foaming agent and also a method for controlling the size of foam by using a bubble diameter adjusting agent when the gypsum slurry is prepared.

Also, the shape of the pores formed by the foam included in the gypsum panel is preferably a good spherical shape.

By allowing the foam included in the gypsum panel to have a good spherical shape, the strength of the gypsum panel can be increased.

Further, the shape of the pores formed by the foam included in the gypsum panel is preferably a completely spherical shape or a nearly completely spherical shape. By allowing the foam included in the gypsum panel to have a completely spherical shape or a nearly completely spherical shape, the strength of the gypsum panel can be further increased.

The diameter and the shape of the pores formed by the foam included in the gypsum panel may be observed and evaluated by taking a cross-section at any point of the gypsum panel, for example. The observation and evaluation may be performed through, for example, a microscope or a scanning electron microscope (SEM) that enables enlargement of the cross-section of the gypsum panel when observed.

As described above, the gypsum panel according to the present embodiment may be produced by molding the gypsum slurry and hardening the gypsum slurry through hydration. Subsequently, the gypsum panel according to the present embodiment may also be dried. Accordingly, in addition to the above-described pores formed by the foam, the gypsum panel according to the present embodiment may also include pores formed after water added to the gypsum slurry is dried.

The pores formed by the water are formed between crystals. Therefore, unlike the above-described pores formed by the foam, the pores formed by the water do not have spherical shapes. Also, while the pores formed by the foam may have the diameter of 10 μm or more, the diameter of the pores formed by the water becomes smaller. Accordingly, the pores formed by the foam and the pores formed by the water may be distinguished by their shapes and sizes.

Further, the gypsum panel according to the present embodiment may include other components.

For example, in addition to the above-described components such as calcined gypsum, water, a termiticide, and foam, it is possible to add, to the gypsum slurry prepared in producing the gypsum panel, starch, an adhesion improver, such as polyvinyl alcohol, for improving adhesion between a covering material and the gypsum core, inorganic fibers and lightweight aggregates, such as glass fibers, refractory materials such as vermiculite, a setting modifier, a water reducing agent, a bubble diameter adjusting agent such as a sulfosuccinic acid salt surfactant, a water repellent such as silicone or paraffin, and various type of other additives conventionally added to raw materials of gypsum hardened bodies.

Therefore, the gypsum panel according to the present embodiment may also include substances derived from the above-described components added to the gypsum slurry.

In the above-described gypsum panel according to the present embodiment, a termiticide is contained across the entire gypsum core included in the gypsum panel, allowing a sufficient anti-termite effect to be exhibited. Also, in the gypsum panel according to the present embodiment, the termiticide is distributed mainly on the surface sides of the gypsum core of the gypsum panel. Thus, it is possible to exhibit a sufficient anti-termite effect while suppressing the amount of a termiticide added.

[Method for Producing Gypsum Panel]

Next, a method for producing a gypsum panel according to the present embodiment will be described. By using the method for producing a gypsum panel according to the present embodiment, the above-described gypsum panel may be preferably produced. A duplicate description thereof will be partially omitted.

First Exemplary Configuration

A first exemplary configuration of the method for producing a gypsum panel according to the present embodiment will be described.

The method for producing a gypsum panel according to the present embodiment refers to a method for producing a gypsum panel including a gypsum core containing a termiticide with poor water solubility, and may include the following steps:

A kneading step for kneading a raw material including at least calcined gypsum, water, and a termiticide so as to form a gypsum slurry, a molding step for molding the gypsum slurry, and a hardening step for hardening a molded body obtained in the molding step.

An average particle size of the calcined gypsum used in the raw material may be 100 μm or less, and an average particle size of the termiticide may be 50 μm or less.

The respective steps will be described below.

First, the kneading step will be described.

In the kneading step, the raw material including calcined gypsum, water, and a termiticide may be kneaded.

The calcined gypsum included in the raw material is also called calcium sulfate hemihydrate, and is a hydraulic inorganic composition. Examples of the calcined gypsum used in the method for producing the gypsum panel according to the present embodiment include one of or a mixture of α-calcined gypsum and β-calcined gypsum obtained by calcining one of or a mixture of natural gypsum, by-product gypsum, and flue-gas gypsum at atmospheric pressure or in water (including in steam). Also, it is no problem for the calcined gypsum used in the method for producing the gypsum panel according to the present embodiment to include III type anhydrous gypsum produced in minute amounts when the calcined gypsum is obtained.

In order to produce α-calcined gypsum, dihydrate gypsum such as natural gypsum needs to be compressed and calcined in water or in steam by using an autoclave. In contrast, β-calcined gypsum may be produced by calcining dihydrate gypsum such as natural gypsum at normal atmospheric pressure.

Also, the termiticide included in the raw material is not particularly limited, and various types of termiticides may be used as long as such termiticides can be applied to the gypsum panel. However, as described above, a termiticide with poor water solubility may be preferably used. The materials that may be preferably used as the termiticide have already been described above, and thus a description thereof will be omitted.

A form for providing the termiticide included in the raw material, that is, a formulation of the termiticide is not particularly limited. For example, various formulations such as a microencapsulated formulation, an emulsifiable formulation, and a slurry formulation may be used as described above. In particular, the termiticide may preferably use a microencapsulated formulation.

A content of the termiticide in the raw material is not particularly limited. For example, the content of the termiticide with respect to a total content of the calcined gypsum and the termiticide in the raw material is preferably greater than or equal to $3.0 \times 10^{-5}$ mass % and less than or equal to $1.5 \times 10^{-2}$ mass %, and more preferably greater than or equal to $7.5 \times 10^{-4}$ mass % and less than or equal to $8.0 \times 10^{-3}$ mass %.

For example, when a plate-shaped gypsum panel is produced, by setting the content of the termiticide with respect to the total content of the calcined gypsum and the termiticide in the raw material to be greater than or equal to $3.0 \times 10^{-5}$ mass %, the termiticide may be more uniformly dispersed in the raw material.

Also, when the gypsum panel is produced, by setting the content of the termiticide with respect to the total content of the calcined gypsum and the termiticide in the raw material to be less than or equal to $1.5 \times 10^{-2}$ mass %, a sufficient anti-termite effect may be exhibited.

Further, the content of the termiticide may be more than $1.5 \times 10^{-2}$ mass %. However, as compared to the gypsum panel containing the termiticide of less than or equal to $1.5 \times 10^{-2}$ mass %, an anti-termite effect does not appreciably increase. Accordingly, the above-described content of the termiticide is preferably $1.5 \times 10^{-2}$ mass %.

The average particle size of the calcined gypsum used in the raw material is not particularly limited, and is, for example, preferably less than or equal to 100 μm and more preferably less than or equal to 50 μm. The lower limit value of the average particle size of the calcined gypsum may be at least 10 μm, for example.

Further, the average particle size of the termiticide used in the raw material is not particularly limited, and is preferably less than or equal to 50 μm and more preferably less than or equal to 20 μm, for example. When the average particle size of the termiticide used in the raw material exceed 50 μm, the termiticide may be precipitated at the time of formulation, which may result in difficulty in handling. When the average particle size is less than or equal to 20 μm, the termiticide can be distributed specifically in surface layers of an end product. Therefore, the average particle size being less than or equal to 20 μm is preferable. Also, the average particle size of the termiticide used in the raw material is preferably greater than or equal to 0.1 μm, more preferably greater than or equal to 0.5 μm, even more preferably greater than or equal to 3.0 μm, for example. It may be technically difficult to produce a termiticide having an average particle size of less than 0.1 μm. Also, a special technique may be required to produce a termiticide having an average particle size of less than 0.5 μm. Further, it may be difficult to produce, in high concentration, a termiticide having an average particle size of less than 3.0 μm.

Further, the term average particle size refers to a particle size (median size) at a cumulative value of 50% in the particle size distribution as measured by a laser diffraction/scattering method. Unless otherwise specified herein, the average particle size has the same meaning.

In the method for producing the gypsum panel according to the present embodiment, the gypsum slurry molded into a desired shape is hardened through hydration and is subsequently dried such that the gypsum panel is produced. While the gypsum slurry is dried, water contained in the gypsum slurry is moved to the surfaces of the gypsum panel and is discharged to the outside. Further, while the gypsum slurry is dried, it is contemplated that the water contained in the gypsum slurry is moved to the surfaces of the gypsum panel together with additive components such as a termiticide contained in the gypsum slurry.

Further, in a case where the average particle size of the calcined gypsum included in the raw material of the gypsum slurry is less than or equal to 100 μm and also the average particle size of the termiticide included in the raw material of the gypsum slurry is less than or equal to 50 μm, gaps having a suitable size for the termiticide to pass through between hydrated calcined gypsum particles are formed, allowing the termiticide to moderately migrate to the surface sides of the gypsum panel.

Accordingly, by adjusting the average particle size of calcined gypsum included in the raw material of the gypsum slurry to be less than or equal to 100 μm and also the average particle size of the termiticide included in the raw material of the gypsum slurry to be less than or equal to 50 μm, it is possible to produce the gypsum panel in which the termiticide is distributed mainly on the surface sides of the above-described gypsum core viewed in the thickness direction.

Next, water added in preparing the gypsum slurry will be described.

Because the gypsum slurry is prepared by kneading calcined gypsum, a termiticide, and the like, water may be added to the gypsum slurry. The amount of water added in forming the gypsum slurry is not particularly limited, and may be a suitable amount according to, for example, the required fluidity.

Additional components other than the above-described calcined gypsum, the termiticide, and the water may be contained in the raw material of the gypsum slurry.

For example, foam may be added to the gypsum slurry. By adjusting the amount of the foam added to the gypsum slurry, the specific gravity of the gypsum panel may fall within a desired range.

A method for adding foam in forming the gypsum slurry is not particularly limited, and any method may be used to add foam. For example, a gypsum slurry including foam may be formed by adding a foaming agent (blowing agent) to water (water for foaming), agitating the water by taking air so as to form foam, and mixing the formed foam with calcined gypsum, a termiticide, and water (water for gypsum slurry). Alternatively, a gypsum slurry including foam may also be formed by adding formed foam to the gypsum slurry that has been preliminarily formed by mixing calcined gypsum, a termiticide, water, and the like.

The foaming agent used to form foam is not particularly limited. Examples of the foaming agent include sodium alkylsulfate, alkyl ether sulfate, sodium alkylbenzene sulfonate, and polyoxyethylene alkyl sulfate.

The amount of the foam added is not particularly limited, and may be appropriately selected according to the specific gravity required for the gypsum panel to be produced.

In addition to the above-described components, it is also possible to add, to the raw material, starch, an adhesion improver, such as polyvinyl alcohol, for improving adhesion between a covering material and the gypsum core, inorganic fibers and lightweight aggregates, such as glass fibers, refractory materials such as vermiculite, a setting modifier, a water reducing agent, a bubble diameter adjusting agent such as a sulfosuccinic acid salt surfactant, a water repellent such as silicone or paraffin, and various types of other additives conventionally added to raw materials of gypsum hardened bodies.

When the gypsum slurry is prepared by kneading the raw material, all components constituting the raw material may be kneaded at the same time or may be kneaded in several batches. For example, solid components of the raw material may be mixed and kneaded so as to form a gypsum composition. Next, liquid components such as water of the raw material are added to the gypsum composition and further kneaded. As a result, the gypsum slurry is formed.

A method for kneading the raw material is not particularly limited, and for example, a mixer may be used.

In the molding step, the obtained gypsum slurry may be molded into a desired shape. To be more specific, the gypsum slurry may be molded into a plate shape in order to produce the gypsum panel.

Figure 2:
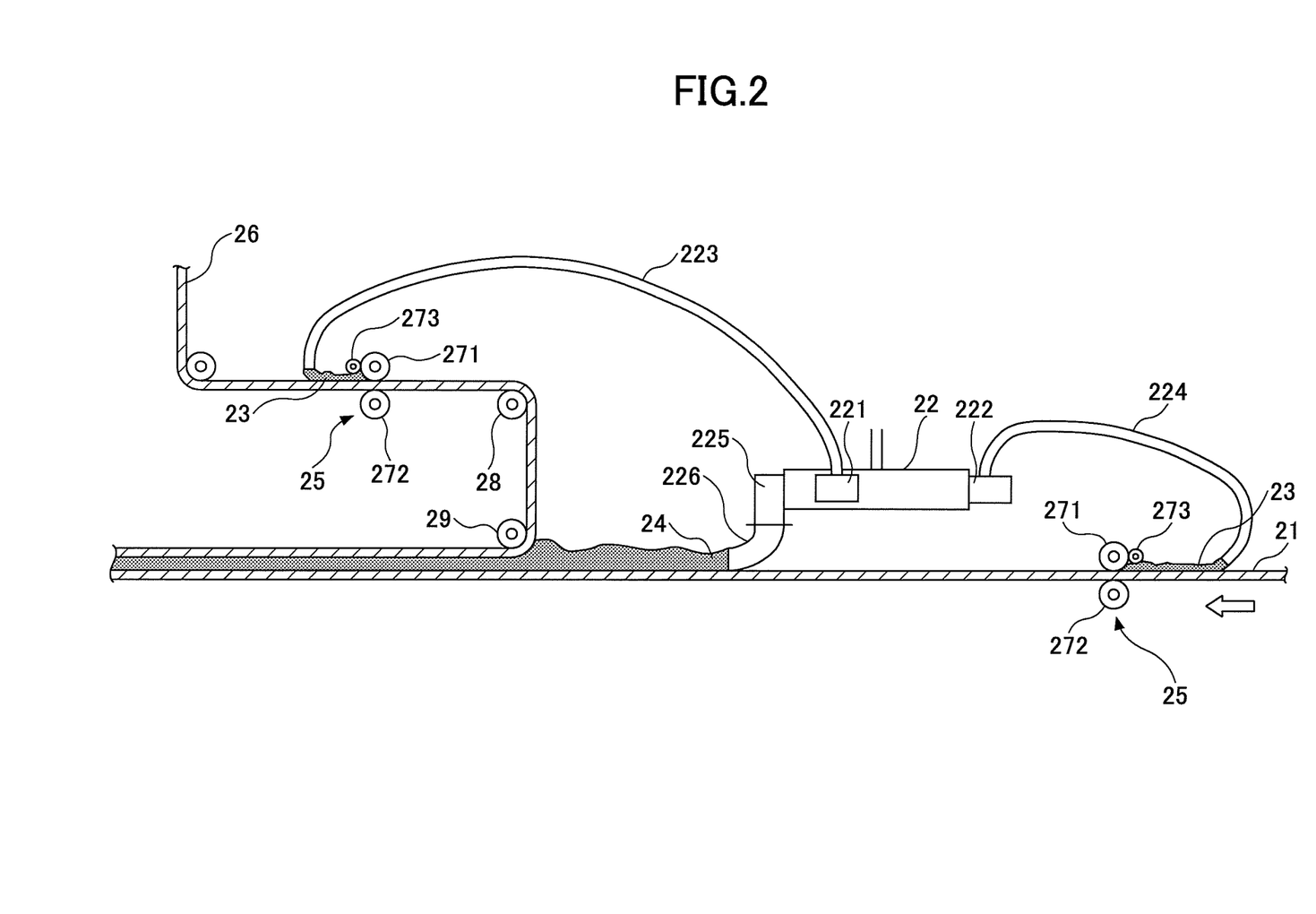
FIG. 2 is a drawing illustrating a method for producing a gypsum board according to the embodiment of the present invention.

Referring now to FIG. 2, an exemplary configuration for the kneading step and the molding step for producing a gypsum board will be described. FIG. 2 is a side view partially and schematically illustrating an exemplary configuration of an apparatus for molding a gypsum board.

Front face cover base paper (board base paper) 21 used as a surface material is conveyed along a production line from the right side to the left side of FIG. 2.

A mixer 22 may be disposed in a predetermined position relative to a conveying line, for example, above or alongside the conveying line. In a single mixer 22, a raw material of a gypsum slurry including calcined gypsum, a termiticide, water, and optionally, various types of additives may be kneaded so as to produce the gypsum slurry.

As described above, a gypsum composition may be prepared in advance by mixing and stirring solid components such as calcined gypsum and may be supplied to the mixer 22.

Further, foam may be added to the gypsum slurry from splitting ports 221, 222, and 225. By adjusting the amount of foam added, the gypsum slurry may have a desired density. For example, by adjusting the amount of foam added, a first gypsum slurry 23 and a second gypsum slurry 24 having different densities may be prepared.

The obtained first gypsum slurry 23 is supplied onto the front face cover base paper (board base paper) 21 and a back face cover base paper (board base paper) 26 through delivery pipes 223 and 224 at upstream sides of the conveying directions of the roll coaters 25.

Herein, 271, 272, and 273 indicate a spreading roll, a backing roll, and a residue removing roll, respectively. The first gypsum slurry 23 on each of the front face cover base paper 21 and the back face cover base paper 26 reaches spreading parts of the roll coaters 25 and is spread by the spreading parts. Both a thin layer of the first gypsum slurry 23 and a marginal region are formed on the front face cover base paper 21. Similarly, a thin layer of the first gypsum slurry 23 is formed on the back face cover base paper 26. FIG. 2 illustrates an example in which the first gypsum slurry 23 is applied to both the front face cover base paper 21 and the back face cover base paper 26 by using the roll coaters 25. However, the present invention is not limited this example. For example, the first gypsum slurry 23 may be applied on only one of the front face cover base paper 21 or the back face cover base paper 26 by using the roll coaters 25. Further, the first gypsum slurry 23 may be disposed only at the side edges of the front face cover base paper 21.

The front face cover base paper 21 is conveyed without changing the direction. The back face cover base paper 26 is turned by a turning roller 28 in the conveying line direction of the front face cover base paper 21. Both the front face cover base paper 21 and the back face cover base paper 26 reach a molder 29. The second gypsum slurry 24 is supplied between the thin layers formed on each of the front face cover base paper 21 and the back face cover base paper 26 from the mixer via the pipe line 226. As a result, a continuous stacked body having a layer formed of the first gypsum slurry 23, a layer formed of the second gypsum slurry 24, and a layer formed of the first gypsum slurry 23 may be formed between the front face cover base paper 21 and the back face cover base paper 26.

FIG. 2 illustrates the example in which the first gypsum slurry 23 and the second gypsum slurry 24 are produced by the single mixer 22. However, two mixers may be provided such that the first gypsum slurry 23 and the second gypsum slurry 24 may be produced by the respective mixers.

Also, embodiments of the present invention are not limited to using the first gypsum slurry and the second gypsum slurry. For example, one type of gypsum slurry with a given density may be produced and supplied onto the board base paper.

To be more specific, a gypsum slurry with a predetermined density may be supplied and deposited onto the front face cover base paper (board base paper) that is conveyed continuously. The front face cover base paper is folded along score lines provided at the side edges of the front face cover base paper such that the gypsum slurry is wrapped by the front face cover base paper. Next, the back face cover base paper (board base paper) that is conveyed at the same speed as the front face cover base paper is superposed on the layer of the gypsum slurry. Subsequently, the layered structure passes through a molder for determining the thickness and the width of the gypsum board. In this way, the gypsum board may be molded.

The exemplary configuration has been described taking the gypsum board as an example. However, various types of gypsum panels may be produced by, for example, replacing the board base paper used as the surface material with a glass fiber nonwoven fabric (glass tissue) or a glass mat, and arranging or embedding the glass fiber nonwoven fabric (glass tissue) or the glass mat on the surface or in the surface.

Next, the hardening step for hardening the gypsum slurry through hydration may be performed.

The hardening step may be performed by causing the calcined gypsum (hemihydrate gypsum) in the gypsum slurry to set and solidify by forming acicular crystals of dihydrate gypsum through a hydration reaction. Namely, the hardening step may be performed by causing calcined gypsum included in the molded body molded in the molding step to react with water added to the gypsum slurry, thereby promoting a hydration reaction of the calcined gypsum.

Also, the method for producing the gypsum panel according to the present embodiment may also include additional steps such as a rough cutting step, a drying step, a cutting step, and a loading step as necessary.

For example, after the above-described molding step is performed, a rough cutting step for cutting the molded body molded in the molding step with a rough cutter may be performed during or after the hardening step. In the rough cutting step, the continuous molded body molded in the molding step may be cut into a predetermined length.

Further, in the drying step, the molded body molded in the molding step or the molded body cut in the rough cutting step is dried so as to remove excess water. Further, the molded body that has undergone the hardening step may be provided in the drying step. In the drying step, a dryer may be used to forcibly dry the molded body.

A method for forcibly drying a molded body by using a dryer is not particularly limited. For example, the dryer may be provided on a conveying path for conveying a molded body such that the molded body may pass through the inside of the dryer and may be continuously dried. Alternatively, molded bodies may be loaded in the dryer such that the molded bodies may be dried in batches.

Further, after the molded body is dried, the cutting step for cutting the molded body into a predetermined length may be performed. Also, the loading step for stacking gypsum hardened bodies or gypsum boards by using a lifter, storing the gypsum hardened bodies or gypsum boards in a warehouse, and loading the gypsum hardened bodies or gypsum boards in a truck for shipping may be performed.

In the above-described method for producing a gypsum panel according to the present embodiment, it is possible to produce a gypsum panel in which a termiticide is distributed mainly on the surface sides of the gypsum panel. As described above, by adjusting the average particle size of calcined gypsum and the average particle size of a termiticide included in raw materials to fall within predetermined ranges, the termiticide included in the gypsum slurries migrates to the surface sides of the gypsum panel, allowing the termiticide to be distributed mainly on the surface sides of the gypsum panel.

In the method for producing a gypsum panel according to the present embodiment, it is possible to produce a gypsum panel by hardening a gypsum slurry obtained by kneading a raw material including calcined gypsum having the average particle size of less than or equal to 100 μm, a termiticide having the average particle size of less than or equal to 50 μm, and water.

Further, in the production method according to the present embodiment, it is possible to produce a gypsum panel including gypsum core containing a termiticide, wherein the gypsum core is formed of a gypsum slurry including at least water, calcined gypsum, and a termiticide, the average particle size of the calcined gypsum is less than or equal to 100 μm, and the average particle size of the termiticide is less than or equal to 50 μm.

In the above gypsum panel, the gypsum core has three regions of a first end region, a center region, and a second end region having an equal thickness and extending along a thickness direction from one surface side to another surface side, and the termiticide can be contained in each of the first end region, the center region, and the second end region. Further, the content of the termiticide in the center region can be made lower than the content of the termiticide in the first end region and in the second end region.

Accordingly, it is possible to produce a gypsum panel having a favorable anti-termite effect while suppressing the content of a termiticide.

Second Exemplary Configuration

Next, a second exemplary configuration of the method for producing a gypsum panel according to the present embodiment will be described.

The method for producing a gypsum panel according to the present embodiment refers to a method for producing a gypsum panel including a gypsum core containing a termiticide with poor water solubility, and may include the following steps.

A kneading step for kneading a raw material including at least calcined gypsum, water, and a termiticide so as to form a gypsum slurry, a molding step for molding the gypsum slurry, and a hardening step for hardening a molded body obtained in the molding step.

In the kneading step, two types of gypsum slurries, a first gypsum slurry and a second gypsum slurry containing a larger amount of foam than that of the first gypsum slurry, may be prepared.

Also, in the molding step, the gypsum slurries are molded into a plate shape by stacking a first surface layer formed of the first gypsum slurry, a center layer formed of the second gypsum slurry, and a second surface layer formed of the first gypsum slurry in this order from the lower surface side.

In the following, the respective steps will be described. A description of the steps that can be performed in the same manner as the first exemplary configuration will be partially omitted.

First, the kneading step will be described.

In the kneading step, the raw material including calcined gypsum, water, and a termiticide may be kneaded.

The calcined gypsum, the termiticide, and the water included in the raw material may be similar to those described in the first exemplary configuration, and thus a description thereof will be omitted.

Further, the raw material used to at least prepare the second gypsum slurry may further include foam. Namely, in the kneading step for preparing the second gypsum slurry, the raw material including calcined gypsum, water, a termiticide, and foam may be kneaded. The foam has already been described in the first exemplary configuration, and thus a description thereof will be omitted.

Further, in the present exemplary configuration, it is possible to produce a gypsum panel in which a termiticide is distributed mainly on the surface sides by using gypsum slurries having different amounts of foam, which will be described later. Therefore, the average particle size of calcined gypsum and the average particle size of a termiticide are not particularly limited. As described in the first exemplary configuration, by adjusting the average particle size of the calcined gypsum to be less than or equal to 100 μm and the average particle size of the termiticide to be less than or equal to 50 μm, the termiticide included in the gypsum slurries can be easily migrated and distributed mainly on the surface sides of the gypsum panel. Therefore, the calcined gypsum and the termiticide having the same average particle sizes as those described in the first exemplary configuration may be used.

Further, in addition to the above-described calcined gypsum and the like, the raw material may also include various types of additives. Examples of such various types of additives have been described in the first exemplary configuration, and thus a description thereof will be omitted.

In the present exemplary configuration, when the gypsum slurries are prepared by kneading the raw material, the first gypsum slurry and the second gypsum slurry containing a larger amount of foam than that of the first gypsum slurry may be prepared.

As described in the first exemplary configuration, all components may be kneaded at the same time so as to form the first gypsum slurry and the second gypsum slurry. Alternatively, a gypsum composition may be preliminarily formed, and subsequently, liquid components are added to the gypsum composition and the gypsum composition may be further kneaded.

Moreover, foam is not necessarily added to the first gypsum slurry.

In the molding step, the gypsum slurries formed in the kneading step may be molded into a plate shape. At this time, the first surface layer, the center layer, and the second surface layer are stacked in this order from the lower surface side such that a stacked structure may be formed. The first surface layer and the second surface layer may be formed of the first gypsum slurry, and the center layer may be formed of the second gypsum slurry.

The thicknesses of the respective layers are not particularly limited. The thickness of the first surface layer and of the second surface layer is preferably greater than or equal to 0.1 mm and less than or equal to 1.0 mm and more preferably greater than or equal to 0.1 mm and less than or equal to 0.5 mm. According to the total thickness of the gypsum board, the remaining thickness is made up of the center layer.

By using the first gypsum slurry and the second gypsum slurry containing a larger amount of foam than that of the first gypsum slurry and stacking the layers as described above, the center layer is formed of the second gypsum slurry containing the large amount of foam. Therefore, the center layer includes more pores than the first surface layer and the second surface layer. As a result, the termiticide is aggregated in the first surface layer and the second surface layer. Therefore, the content of the termiticide in the center layer can be made lower than the content of the termiticide in the first surface layer and in the second surface layer. Accordingly, the gypsum panel in which the termiticide is distributed mainly on the surface sides can be produced.

Referring now to FIG. 2, an exemplary configuration for the kneading step and the molding step for producing a gypsum board will be described. This configuration has already been described in the first exemplary configuration, and thus a duplicate description thereof will be partially omitted.

In the method for producing a gypsum board according to the present exemplary configuration, a raw material of gypsum slurries including calcined gypsum, a termiticide, water, and optionally, various types of additives may be kneaded so as to produce the gypsum slurry. Further, by adding a larger amount of foam from the splitting port 225 than an amount of foam added from the slurry splitting ports 221 and 222, the first gypsum slurry 23 and the second gypsum slurry 24 having different densities can be prepared. Also, foam is not necessarily added from the splitting ports 221 and 222.

The obtained first gypsum slurry 23 is supplied onto the front face cover base paper (board base paper) 21 and the back face cover base paper (board base paper) 26 through the delivery pipes 223 and 224 at upstream sides of the conveying directions of the roll coaters 25. The first gypsum slurry 23 on each of the front face cover base paper 21 and the back face cover base paper 26 reaches the spreading parts of the roll coaters 25 and is spread by the spreading parts. Both a thin layer of the first gypsum slurry 23 and a marginal region are formed on the front face cover base paper 21. Similarly, a thin layer of the first gypsum slurry 23 is formed on the back face cover base paper 26.

The front face cover base paper 21 is conveyed without changing the direction. The back face cover base paper 26 is turned by the turning roller 28 in the conveying line direction of the front face cover base paper 21. Both the front face cover base paper 21 and the back face cover base paper 26 reach the molder 29. The second gypsum slurry 24 containing a larger amount of foam than that of the first gypsum slurry 23 is supplied between the thin layers formed on each of the front face cover base paper 21 and the back face cover base paper 26 from the mixer 22 via the pipe line 26. As a result, a continuous stacked body having the first surface layer formed of the first gypsum slurry 23, the center layer formed of the second gypsum slurry 24, and the second surface layer formed of the first gypsum slurry 23 is formed between the front face cover base paper 21 and the back face cover base paper 26.

FIG. 2 illustrates the example in which the first gypsum slurry 23 and the second gypsum slurry 24 are produced by the single mixer 22. However, two mixers may be provided such that the first gypsum slurry 23 and the second gypsum slurry 24 may be produced by the respective mixers.

The exemplary configuration has been described taking the gypsum board as an example. However, various types of gypsum panels may be produced by, for example, replacing the board base paper used as the surface material with a glass fiber nonwoven fabric (glass tissue) or a glass mat, and arranging or embedding the glass fiber nonwoven fabric (glass tissue) or the glass mat on the surface or in the surface.

The steps after the molding step can be performed in the same way as the first exemplary configuration, and thus a description thereof will be omitted.

In the method for producing a gypsum panel according to the present embodiment, it is possible to produce a gypsum panel including the first surface layer and the second surface layer formed of the first gypsum slurry and located on the surface sides and also including the center layer formed of the second gypsum slurry containing a larger amount of foam than that of the first gypsum slurry. Accordingly, the center layer is formed of the second gypsum slurry containing the large amount of foam, and thus the center layer contains more pores than the first surface layer and the second surface layer. Therefore, the content of the termiticide in the center layer can be made lower than the content of the termiticide in the first surface layer and in the second surface layer. Namely, it is possible to produce the gypsum panel in which the termiticide is distributed mainly on the surface sides of the gypsum panel.

In the method for producing a gypsum panel according to the present embodiment, it is possible to produce a gypsum panel by hardening a plate-shaped stacked body in which the first surface layer formed of the first gypsum slurry obtained by kneading a raw material including calcined gypsum, a termiticide, and water, the center layer formed of the second gypsum slurry obtained by kneading a raw material including calcined gypsum, a termiticide, water, and foam whose amount is larger than the first gypsum slurry, and the second surface layer formed of the first gypsum slurry are stacked in this order.

Further, in the production method according to the present embodiment, it is possible to produce a gypsum panel including a gypsum core containing a termiticide with poor water solubility. The gypsum core may be formed of a stacked body of gypsum slurries.

For example, the stacked body of the gypsum slurries may have a structure in which the first surface layer, the center layer, and the second surface layer are stacked in this order. The stacked body of the gypsum slurries may also have a structure in which the first surface layer and the second surface layer are formed of the first gypsum slurry including at least water, calcined gypsum, and a termiticide and the center layer is formed of the second gypsum slurry including at least water, calcined gypsum, a termiticide, and foam whose amount is larger than the first gypsum slurry.

In the above gypsum panel, the gypsum core has three regions of a first end region, a center region, and a second end region having an equal thickness and extending along a thickness direction from one surface side to another surface side, and the termiticide can be contained in each of the first end region, the center region, and the second end region. Further, the content of the termiticide in the center region can be made lower than the content of the termiticide in the first end region and in the second end region.

Accordingly, it is possible to produce a gypsum panel having a favorable anti-termite effect while suppressing the content of a termiticide.

Third Exemplary Configuration

Next, a third exemplary configuration of the method for producing a gypsum panel according to the present embodiment will be described.

The method for producing a gypsum panel according to the present embodiment refers to a method for producing a gypsum panel including gypsum core containing a termiticide with poor water solubility, and may include the following steps.

A kneading step for kneading a raw material including at least calcined gypsum, water, and a termiticide so as to form a gypsum slurry, a molding step for molding the gypsum slurry, and a hardening step for hardening a molded body obtained in the molding step.

In the kneading step, two types of gypsum slurries, a first gypsum slurry and a second gypsum slurry including a lower content of the termiticide than that of the first gypsum slurry, may be prepared.

Also, in the molding step, the gypsum slurries are molded into a plate shape by stacking a first surface layer formed of the first gypsum slurry, a center layer formed of the second gypsum slurry, and a second surface layer formed of the first gypsum slurry in this order from the lower surface side.

In the following, the respective steps will be described. A description of the steps that can be performed in the same manner as the first exemplary configuration will be partially omitted.

First, the kneading step will be described.

In the kneading step, the raw material including calcined gypsum, water, and a termiticide may be kneaded.

The calcined gypsum, the termiticide, and the water included in the raw material may be similar to those described in the first exemplary configuration, and thus a description thereof will be omitted.

Further, in the exemplary configuration, it is possible to produce a gypsum panel in which a termiticide is distributed mainly on the surface sides of the gypsum panel by using gypsum slurries containing a termiticide in different amounts, which will be described later. Therefore, the average particle size of calcined gypsum and the average particle size of the termiticide are not particularly limited. As described in the first exemplary configuration, by adjusting the average particle size of the calcined gypsum to be less than or equal to 100 μm and the average particle size of the termiticide to be less than or equal to 50 μm, the termiticide included in the gypsum slurries can be easily migrated and distributed mainly on the surface sides of the gypsum panel. Therefore, the calcined gypsum and the termiticide having the same average particle sizes as those described in the first exemplary configuration may be used.

Further, in addition to the above-described calcined gypsum and the like, the raw material may also include various types of additives. Examples of such various types of additives have been described in the first exemplary configuration, and thus a description thereof will be omitted.

In the present exemplary configuration, when the gypsum slurries are prepared by kneading the raw material, the first gypsum slurry and the second gypsum slurry containing a smaller amount of a termiticide than that of the first gypsum slurry may be prepared.

As described in the first exemplary configuration, all components may be kneaded at the same time so as to form the first gypsum slurry and the second gypsum slurry. Alternatively, a gypsum composition may be preliminarily formed, and subsequently, liquid components are added to the gypsum composition and the gypsum composition may be further kneaded.

In the molding step, the gypsum slurries formed in the kneading step may be molded into a plate shape. At this time, the first surface layer, the center layer, and the second surface layer are stacked in this order from the lower surface side such that a stacked structure may be formed. The first surface layer and the second surface layer may be formed of the first gypsum slurry, and the center layer may be formed of the second gypsum slurry.

The thicknesses of the respective three layers are not particularly limited. The thickness of the first surface layer and of the second surface layer are preferably greater than or equal to 0.1 mm and less than or equal to 1.0 mm and more preferably greater than or equal to 0.1 mm and less than or equal to 0.5 mm. According to the total thickness of the gypsum board, the remaining thickness is made up of the center layer.

By using the first gypsum slurry and the second gypsum slurry including a lower content of a termiticide than that of the first gypsum slurry and stacking the layers as described above, the center layer is formed of the second gypsum slurry including the lower content of the termiticide. Accordingly, the content of the termiticide in the center layer can be made lower than the content of the termiticide in the first surface layer and in the second surface layer. Thus, the gypsum panel in which the termiticide is distributed mainly on the surface sides can be produced.

Further, the configuration described in the second exemplary configuration may also be used together. Namely, the second gypsum slurry may be formed such that the content of the termiticide may be made lower than that in the first gypsum slurry, and the amount of foam may be made larger than that of the first gypsum slurry. In this way, a termiticide can be more securely distributed mainly on the surface sides.

Referring now to FIG. 2, an exemplary configuration for the kneading step and the molding step for producing a gypsum board will be described. This configuration has already been described in the first exemplary configuration, and thus a duplicate description thereof will be partially omitted.

In the method for producing a gypsum board according to the third exemplary configuration, a raw material of gypsum slurries including calcined gypsum, a termiticide, water, and optionally, various types of additives may be kneaded so as to produce the underlying gypsum slurries. Further, by adding the termiticide from the splitting ports 221 and 222, the first gypsum slurry 23 including a higher content of the termiticide and the second gypsum slurry 24 including a lower content of the termiticide can be prepared.

The obtained first gypsum slurry 23 is supplied onto the front face cover base paper (board base paper) 21 and the back face cover base paper (board base paper) 26 through the delivery pipes 223 and 224 at upstream sides of the conveying directions of the roll coaters 25. The first gypsum slurry 23 on each of the front face cover base paper 21 and the back face cover base paper 26 reaches the spreading parts of the roll coaters 25 and is spread by the spreading parts. Both a thin layer of the first gypsum slurry 23 and a marginal region are formed on the front face cover base paper 21. Similarly, a thin layer of the first gypsum slurry 23 is formed on the back face cover base paper 26.

The front face cover base paper 21 is conveyed without changing the direction. The back face cover base paper 26 is turned by the turning roller 28 in the conveying line direction of the front face cover base paper 21. Both the front face cover base paper 21 and the back face cover base paper 26 reach the molder 29. The second gypsum slurry 24 including the lower content of the termiticide than that of the first gypsum slurry 23 is supplied between the thin layers formed on each of the front face cover base paper 21 and the back face cover base paper 26 from the mixer 22 via the pipe line 26. As a result, a continuous stacked body having the first surface layer formed of the first gypsum slurry 23, the center layer formed of the second gypsum slurry 24, and the second surface layer formed of the first gypsum slurry 23 may be formed between the front face cover base paper 21 and the back face cover base paper 26.

FIG. 2 illustrates the example in which the first gypsum slurry 23 and the second gypsum slurry 24 are produced by the single mixer 22. However, two mixers may be provided such that the first gypsum slurry 23 and the second gypsum slurry 24 may be produced by the respective mixers. In this case, by changing the content of a termiticide in the raw material supplied to the mixers, two types of gypsum slurries having different termiticide contents can be prepared.

The exemplary configuration has been described taking the gypsum board as an example. However, various types of gypsum panels may be produced by, for example, replacing the board base paper used as the surface material with a glass fiber nonwoven fabric (glass tissue) or a glass mat, and arranging or embedding the glass fiber nonwoven fabric (glass tissue) or the glass mat on the surface or in the surface.

The steps after the molding step can be performed in the same way as the first exemplary configuration, and thus a description thereof will be omitted.

In the method for producing a gypsum panel according to the present embodiment, it is possible to produce a gypsum panel including the first surface layer and the second surface layer formed of the first gypsum slurry and located on the surface sides and also including the center layer formed of the second gypsum slurry whose content of the termiticide is lower than that of the first gypsum slurry. Namely, it is possible to produce the gypsum panel in which the termiticide is distributed mainly on the surface sides of the gypsum panel.

Also, in the production method according to the present embodiment, it is possible to produce a gypsum panel including a gypsum core containing a termiticide with poor water solubility. The gypsum core may be formed of a stacked body of gypsum slurries.

For example, the stacked body of the gypsum slurries may include a structure in which the first surface layer, the center layer, and the second surface layer are stacked in this order. The first surface layer and the second surface layer are formed of the first gypsum slurry including at least water, calcined gypsum, and a termiticide. Also, the center layer is formed of the second gypsum slurry including at least water, calcined gypsum, and a termiticide. The content of the termiticide in the second gypsum slurry is lower than that that of the first gypsum slurry.

Further, in the method for producing a gypsum panel according to the present embodiment, it is possible to produce a gypsum panel by hardening a stacked body in which the first surface layer formed of the first gypsum slurry obtained by kneading a raw material containing calcined gypsum, a termiticide, and water, the center layer formed of the second gypsum slurry obtained by kneading a raw material containing calcined gypsum, water, and a termiticide whose content is lower than the first gypsum slurry, and the second surface layer formed of the first gypsum slurry are stacked in this order.

In the above gypsum panel, the gypsum core has three regions of a first end region, a center region, and a second end region having an equal thickness and extending along a thickness direction from one surface side to another surface side, and the termiticide can be contained in each of the first end region, the center region, and the second end region. Further, the content of the termiticide in the center region can be made lower than the content of the termiticide in the first end region and in the second end region.

Accordingly, it is possible to produce a gypsum panel having a favorable anti-termite effect while suppressing the content of a termiticide.

EXAMPLES

In the following, specific examples are described. However, the present invention is not limited these specific examples.

Example 1

A gypsum board was produced by using the apparatus illustrated in FIG. 2, and the content of a termiticide in the gypsum board was evaluated.

Referring to FIG. 2, a method for producing the gypsum board will be described.

First, a process for producing the gypsum board will be described.

The front face cover base paper (board base paper) 21 is continuously conveyed along the production line from the right side to the left side of FIG. 2. In the present example, 200 g/m² of board base paper was used as both the front face cover base paper 21 and the back face cover base paper 26 described later.

In the single mixer 22, a gypsum slurry was prepared in such a manner that a composition was obtained by kneading 0.0024 parts by mass of a termiticide with poor water solubility (manufactured by Osaka Gas Chemicals Co., Ltd., active ingredient: clothianidin, average particle size of 5.9 μm, 1 or less mass % of solubility in water, microencapsulated formulation), 1 part by mass of a setting modifier, 0.3 parts by mass of a water reducing agent, 0.5 parts of mass of an adhesion improver, and 80 parts by mass of water, relative to 100 parts by mass of calcined gypsum having an average particle size of 50 μm (kneading step). Average particle sizes of the calcined gypsum and the termiticide were evaluated by using a laser diffraction particle size distribution measuring apparatus (manufactured by Nikkiso Co., Ltd., trade name: Microtrack HRA).

The obtained gypsum slurry in mixer 22 is supplied onto the front face cover base paper 21 and the back face cover base paper 26 through the delivery pipes 223 and 224 at upstream sides of the conveying directions of the roll coaters 25.

The first gypsum slurry 23 on each of the front face cover base paper 21 and the back face cover base paper 26 reaches the spreading parts of the roll coaters 25 and is spread by the spreading parts. Both a thin layer of the first gypsum slurry 23 and a marginal region were formed on the front face cover base paper 21. Similarly, a thin layer of the first gypsum slurry 23 is formed on the back face cover base paper 26.

The front face cover base paper 21 is conveyed without changing the direction. The back face cover base paper 26 is turned by the turning roller 28 in the conveying line direction of the front face cover base paper 21.

Both the front face cover base paper 21 and the back face cover base paper 26 reach the molder 29. The second gypsum slurry 24 is supplied between the thin layers formed on each of the front face cover base paper 21 and the back face cover base paper 26 from the mixer 22 via the pipe line 226.

Foam was added from the splitting ports 225 such that the specific gravity of the gypsum core becomes 0.65. The foam was prepared by foaming a foaming agent (main component: alkyl ether sulfate).

After being passed through the molder 29, a continuous stacked body having layers formed of the first gypsum slurry 23 and the second gypsum slurry was formed between the front face cover base paper 21 and the back face cover base paper 26. The stacked body was molded such that the thickness of the gypsum board becomes 12.5 mm (molding step).

The obtained molded body was hardened in the process of conveyance (hardening step). The molded body that has been hardened reaches a rough cutter (not illustrated). The rough cutter cuts the continuous stacked body into a plate-shaped body having a predetermined length. In this way, a plate-shaped body including a core material consisting mainly of gypsum covered by base paper is formed. Namely, a semi-finished product of the gypsum board is formed.

The stacked body cut by the rough cutter further passed through a dryer (not illustrated) and was forcibly dried so as to remove excess water (drying step). Subsequently, the stacked body was cut into a product with a predetermined length so as to produce the gypsum board.

The base paper was removed from the both surfaces of the gypsum board to obtain a gypsum core alone. The gypsum core was divided, from one surface side to the other surface side along the thickness direction, into three regions of a first end region, a center region, and a second end region with the same thickness. Then, the divided three regions were each powderized.

The powderized regions of the gypsum core were weighed to obtain each 1-g sample. After 5 ml of acetonitrile was added, the samples were each irradiated with ultrasonic waves for 30 minutes. By using a HPCL method, the content of the active ingredient of the termiticide in each of the samples was measured.

Table 1 indicates the results.

TABLE 1

| | CONTENT OF ACTIVE INGREDIENT IN 1 g OF SAMPLE (μg) |
|---|---|
| FIRST END REGION | 18 |
| CENTER REGION | 8 |
| SECOND END REGION | 18 |

According to the results indicated in Table 1, the active ingredient of the termiticide was detected in each of the first end region, the center region, and the second end region. Accordingly, it was shown that the termiticide was contained across the thickness direction of the gypsum board.

Further, it was also shown that the content of the active ingredient of the termiticide in the center region was lower than that in the first end region and in the second end region. Namely, it was shown that the gypsum board in which the termiticide was distributed mainly on both surface sides was produced.

Comparative Example 1

A gypsum board was produced in the same way as Example 1, except that a termiticide was not added. After the gypsum board was produced, a dispersion liquid in which 0.33 g of a termiticide (the same as that of Example 1) was dispersed in water was applied to one face cover base paper and the other cover paper of the gypsum board cut in a size of 200 mm×200 mm.

After the termiticide was applied to the both surfaces of the gypsum board and was dried, the cover paper was removed from the both surfaces of the gypsum board so as to obtain a gypsum core alone. The gypsum core was divided, from one surface side to the other surface side along the thickness direction, into three regions of a first end region, a center region, and a second end region with the same thickness. Then, the divided three regions were each powderized.

The removed cover base paper and the powderized regions of the gypsum core were weighed to obtain each 1-g sample. After 5 ml of acetonitrile was added, the samples were each irradiated with ultrasonic waves for 30 minutes. By using the HPCL method, the content of the active ingredient of the termiticide in each of the samples was measured.

Table 2 indicates the results. In Table 2, the face cover base paper on the first end region is represented as one surface base paper and the face cover base paper on the second end region is represented as the other base paper.

TABLE 2

| | CONTENT OF ACTIVE INGREDIENT IN 1 g OF SAMPLE (μg) |
|---|---|
| ONE SURFACE BASE PAPER | 120 |
| FIRST END REGION | 0 |
| CENTER REGION | 0 |
| SECOND END REGION | 0 |
| OTHER SURFACE BASE PAPER | 120 |

According to the results indicated in Table 2, it was shown that, when the termiticide was applied to the face cover base papers after the gypsum board is produced, the termiticide remained on the face cover base papers and did not penetrate into the inside of the gypsum core.

Example 2

A gypsum slurry was prepared in such a manner that a composition was obtained by kneading 0.0024 parts by mass of a termiticide (the same as that of Example 1), 1 part by mass of a setting modifier, 0.3 parts by mass of a water reducing agent, and 80 parts by mass of water, relative to 100 parts by mass of calcined gypsum having an average particle size of 50 μm in a commercially available blender (manufactured by SANYO Electric CO., Ltd., model number: SM-R50). Subsequently, foam was added to the gypsum slurry such that the specific gravity of a gypsum hardened body, which is the gypsum slurry to be hardened, becomes 0.65 (kneading step).

The obtained gypsum slurry was inserted between glass plates such that the hardened body has a plate shape with a thickness of 12.5 mm (molding step).

The obtained molded body was hardened and the gypsum hardened body was formed (hardening step).

Further, the gypsum hardened body was forcibly dried by the dryer so as to remove excess water (drying step). As a result, the gypsum panel was produced.

The gypsum panel produced in the present example, the gypsum board of Example 1, and the gypsum panel to which no termiticide was added were tested to compare anti-termite effects.

A test procedure for comparing anti-termite effects will be described.

Three plastic containers with lids were prepared. Quartz sand with water content of 8% was spread in a layer of 1 cm thickness over the bottom of each of the containers. A water content of 8% is a water content highly suitable for a termite activity.

After the gypsum panel according to the present embodiment, the gypsum board of Example 1, and the gypsum panel containing no termiticide were placed on the Quartz sand in the containers, bait logs were placed on these test samples. In the middle of each of the container, 50 Formosan subterranean termite workers were released and the number of days before the Formosan subterranean termites were killed was measured.

The gypsum panels and the gypsum board were each cut in a size of 40 mm×20 mm×12.5 mm. Also, the content of the termiticide in the gypsum panel according to the present embodiment and in the gypsum board of Example 1 was approximately 13.2 μg/cm$^3$.

Table 3 indicates the results.

TABLE 3

| TEST SAMPLES | NUMBER OF DAYS BEFORE FORMOSAN SUBTERRANEAN TERMITES WERE KILLED |
|---|---|
| GYPSUM PANEL CONTAINING NO TERMITE REPELLENT | NOT KILLED |
| GYPSUM BOARD OF EXAMPLE 1 | 6 DAYS |
| GYPSUM PANEL OF EXAMPLE 2 | 9 DAYS |

According to the results indicated in Table 3, it was observed that the Formosan subterranean termites were killed after 6 days in the gypsum board of Example and the Formosan subterranean termites were killed after 9 days in the gypsum panel of Example 2. According to the results, even if the content of the termiticide was suppressed to 13.2 µg/cm$^3$, it is possible to produce a gypsum panel having a sufficient anti-termite effect by distributing the termiticide mainly on the surfaces sides.

Although a gypsum panel and a method for producing a gypsum panel have been described above according to the embodiments, the present invention is not limited to the above-described embodiments. Various variations and modifications may be made without departing from the scope of the present invention.

The present application is based on and claims the benefit of priority of Japanese Patent Application No. 2015-243579 filed on Dec. 14, 2015, the entire contents of which are herein incorporated by reference.

DESCRIPTION OF THE REFERENCE NUMERAL 10 gypsum core
11 one surface
12 the other surface
141 first end region
142 center region
143 second end region

The invention claimed is:

1. A gypsum panel comprising a gypsum core containing a termiticide with solubility in water of 1 mass % or less,
   wherein the gypsum core has a first end region, a center region, and a second end region having an equal thickness and extending along a thickness direction from one surface side to another surface side,
   the termiticide is contained in each of the first end region, the center region, and the second end region, and
   a content of the termiticide in the center region is lower than a content of the termiticide in the first end region and in the second end region.

2. The gypsum panel according to claim 1, wherein a content of the termiticide per 1 cm$^3$ of the gypsum core is greater than or equal to 0.1 µg and less than or equal to 330 µg.

3. The gypsum panel according to claim 1, wherein a content of the termiticide per 1 cm$^3$ of the gypsum core is greater than or equal to 0.1 µg and less than or equal to 180 µg.

* * * * *